(12) United States Patent
Xie

(10) Patent No.: US 10,407,313 B2
(45) Date of Patent: Sep. 10, 2019

(54) SYNTHESIS OF ALUMINOSILICATE ZEOLITES HAVING THE OFFRETITE STRUCTURE

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 103 days.

(21) Appl. No.: 15/895,207

(22) Filed: Feb. 13, 2018

(65) Prior Publication Data

US 2018/0282171 A1   Oct. 4, 2018

Related U.S. Application Data

(60) Provisional application No. 62/479,371, filed on Mar. 31, 2017.

(51) Int. Cl.
| | |
|---|---|
| *C01B 39/30* | (2006.01) |
| *B01J 29/50* | (2006.01) |
| *C01B 39/48* | (2006.01) |
| *B01J 37/04* | (2006.01) |
| *B01J 37/00* | (2006.01) |
| *B01J 37/10* | (2006.01) |

(52) U.S. Cl.
CPC .............. *C01B 39/48* (2013.01); *B01J 29/50* (2013.01); *B01J 37/0018* (2013.01); *B01J 37/04* (2013.01); *B01J 37/10* (2013.01); *C01B 39/305* (2013.01)

(58) Field of Classification Search
CPC .............................. C01B 39/305; B01J 29/50
See application file for complete search history.

(56) References Cited

U.S. PATENT DOCUMENTS 5,756,064 A      5/1998 Verduijn
2018/0127282 A1*  5/2018 Corma Canos ........ B01J 29/763

FOREIGN PATENT DOCUMENTS

GB          1188043         4/1970

OTHER PUBLICATIONS

Gomez-Horiguela, Ed., Insights into the Chemistry of Organic Structure Directing Agents in the Synthesis of Zeolitic Materials, 2-18, pp. 1-250 (Year: 2018).*
M.G. Howden "Synthesis of offretite: Part 1. Using various organic compounds as templates" Zeolites 1987, 7, 255-259.
M.G. Howden "Synthesis of offretite: Part 2. Using a combination of tetramethylammonium cations and monoethanolamine or 1,2-diaminoethane as template" Zeolites 1987, 7, 260-264.
M. Itakura, Y. Oumi, M. Sadakane and T. Sano "Synthesis of high-silica offretite by the interzeolite conversion method" Mater. Res. Bull. 2010, 45, 646-650.

* cited by examiner

*Primary Examiner* — David M Brunsman
(74) *Attorney, Agent, or Firm* — Terrence M. Flaherty

(57) ABSTRACT

A method is provided for the synthesis of a zeolite of the offretite structure using cyclopropyltrimethylammonium cations as a structure directing agent.

8 Claims, 2 Drawing Sheets

SYNTHESIS OF ALUMINOSILICATE ZEOLITES HAVING THE OFFRETITE STRUCTURE

CROSS-REFERENCE TO RELATED APPLICATIONS

This application claims the benefit of U.S. Provisional Application Ser. No. 62/479,371 filed Mar. 31, 2017, which is herein incorporated by reference in its entirety.

TECHNICAL FIELD

This disclosure relates generally to a method for synthesizing a zeolite of OFF framework type.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction. Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

One of the zeolitic structure structures which occurs naturally is offretite. Naturally occurring offretite is rare, and it is known to produce offretite synthetically. For example, Great Britain Patent No. 1,188,043 discloses a synthetic aluminosilicate offretite type material and its synthesis in the presence of tetramethylammonium cations.

M. Itakura et al. (*Mater. Res. Bull.* 2010, 45, 646-650) report the synthesis of high-silica offretite (Si/Al molar ratio=7.6-8.0) by interzeolite conversion of faujasite in the presence of both benzyltrimethylammonium hydroxide and structure-forming alkali metal cations.

According to the present disclosure, high-silica OFF framework type zeolites can be synthesized using cyclopropyltrimethylammonium cations as a structure directing agent.

SUMMARY

In one aspect, there is provided a method for preparing a zeolite of OFF framework type, the method comprising: (a) preparing a reaction mixture comprising: (1) a source of silicon oxide; (2) a source of aluminum oxide; (3) a source of a Group 1 or Group 2 metal; (4) a structure directing agent comprising cyclopropyltrimethylammonium cations; (5) a source of hydroxide ions; and (6) water; and (b) subjecting the reaction mixture to crystallization conditions sufficient to form crystals of the zeolite.

In another aspect, there is provided a zeolite of OFF framework type and, in its as-synthesized form, comprising cyclopropyltrimethylammonium cations in its pores.

DETAILED DESCRIPTION

Introduction

Figure 1:
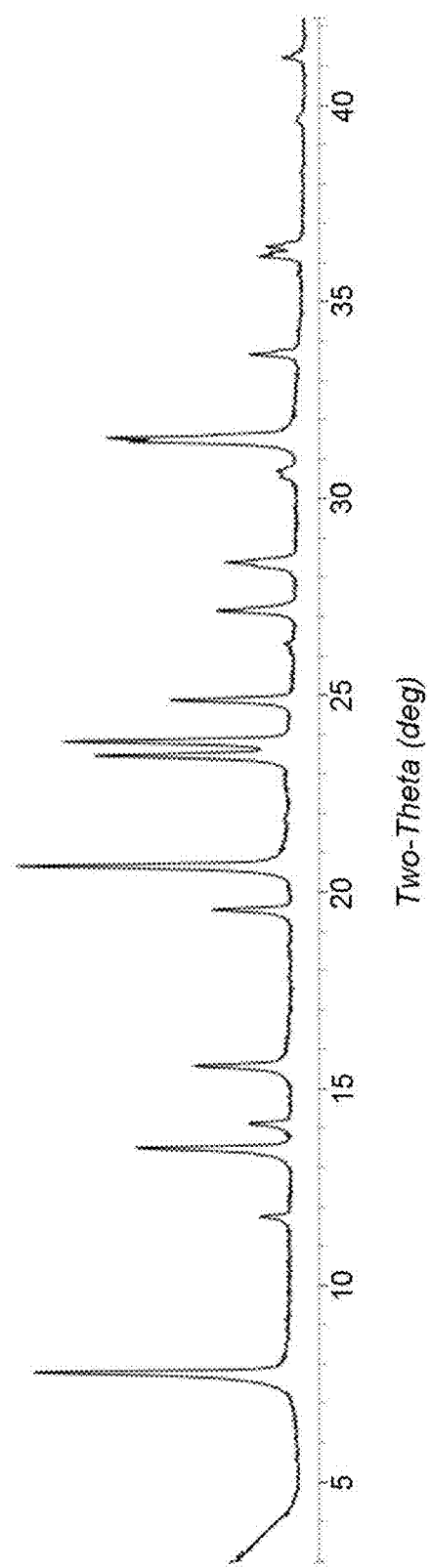
FIG. 1 is a powder X-ray diffraction (XRD) pattern of the as-synthesized zeolite prepared in Example 1.

The following terms will be used throughout the specification and will have the following meanings unless otherwise indicated.

The term "OFF framework type" is used in the sense described in the "*Atlas of Zeolite Framework Types*," Sixth Revised Edition, Elsevier (2007).

The term "as-synthesized" is employed herein to refer to a zeolite in its form after crystallization, prior to removal of the structure directing agent.

The term "anhydrous form" is employed herein to refer to a zeolite substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a zeolite of OFF framework type can be synthesized by: (a) preparing a reaction mixture comprising (1) a source of silicon oxide; (2) a source of aluminum oxide; (3) a source of a Group 1 or Group 2 metal (M); (4) a structure directing agent (Q) comprising cyclopropyltrimethylammonium cations; (5) a source of hydroxide ions; and (6) water; and (b) subjecting the reaction mixture to crystallization conditions sufficient to form crystals of the zeolite.

The composition of the reaction mixture from which the zeolite is formed, in terms of molar ratios, is identified in Table 1 below:

TABLE 1

|  | Broad | Exemplary |
|---|---|---|
| $SiO_2/Al_2O_3$ | 10 to 100 | 20 to 80 |
| $M/SiO_2$ | 0.10 to 0.60 | 0.20 to 0.50 |
| $Q/SiO_2$ | 0.10 to 0.50 | 0.15 to 0.35 |
| $OH/SiO_2$ | 0.30 to 1.00 | 0.40 to 0.70 |
| $H_2O/SiO_2$ | 10 to 60 | 15 to 40 | wherein M and Q are as described herein above.

Suitable sources of silicon oxide include colloidal silica, precipitated silica, fumed silica, alkali metal silicates, and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Examples of suitable Group 1 or Group 2 metals (M) include sodium, potassium and calcium, with potassium being preferred. The metal (M) is generally present in the reaction mixture as the hydroxide.

The structure directing agent (Q) comprises cyclopropyltrimethylammonium cations, represented by the following structure (1):

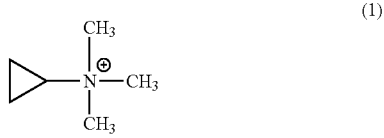

(1)

Suitable sources of Q are the hydroxides, chlorides, bromides, and/or other salts of the quaternary ammonium compound.

The reaction mixture may also include seeds of a molecular sieve material, such as offretite crystals from a previous synthesis, in an amount of from 0.1 to 10 wt. % (e.g., from 0.5 to 5 wt. %) of the reaction mixture.

For each embodiment described herein, the reaction mixture can be supplied by more than one source. Also, two or more reaction components can be provided by one source.

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the zeolite from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 3 to 15 days. Crystallization is usually carried out in closed system under autogenous pressure.

Once the zeolite crystals have formed, the solid product is recovered from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pore structure at least a portion of the structure directing agent used in the synthesis.

The as-synthesized zeolite may be subjected to treatment to remove part or all of the structure directing agent used in its synthesis. This is conveniently effected by thermal treatment (calcination) in which the as-synthesized material is heated at a temperature of at least about 370° C. for at least 1 minute and generally not longer than 20 hours. The thermal treatment can be performed at a temperature up to about 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

Extra-framework Group 1 or 2 metal cations (e.g., $K^+$) in the as-synthesized zeolite can be replaced in accordance with techniques well known in the art by ion exchange with other cations. Preferred replacing cations include metal ions, hydrogen ions, hydrogen precursor (e.g., ammonium ions), and mixtures thereof. Particularly preferred replacing cations are those which tailor the catalytic activity for certain hydrocarbon conversion reactions. These include hydrogen, rare earth metals and metals of Groups 2 to 15 of the Periodic Table of the Elements.

The zeolite disclosed herein can be formulated with into a catalyst composition by combination with other materials, such as binders and/or matrix materials, which provide additional hardness or catalytic activity to the finished catalyst. When blended with such components, the relative proportions of the present zeolite and matrix may vary widely with the content of the zeolite of OFF framework type ranging from 1 to 90 wt. % (e.g., 2 to 80 wt. %) of the composite.

Characterization of the Zeolite

In its as-synthesized and anhydrous form, the present OFF framework type zeolite has a chemical composition, in terms of molar ratios, as set forth in Table 2:

TABLE 2

|  | Broad | Exemplary |
|---|---|---|
| $SiO_2/Al_2O_3$ | 5 to 20 | 10 to 20 |
| $Q/SiO_2$ | >0 to 0.1 | >0 to 0.1 |
| $M/SiO_2$ | >0 to 0.1 | >0 to 0.1 | wherein Q and M are as described herein above.

It should be noted that the as-synthesized form of the zeolite disclosed herein may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

The OFF framework type zeolites synthesized as described herein are characterized by their X-ray diffraction pattern. X-ray diffraction patterns representative of OFF framework type zeolites can be referenced in the "*Collection of Simulated XRD Powder Patterns for Zeolites*," Fifth Revised Edition, Elsevier (2007), published on behalf of the Structure Commission of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor perturbations, the basic crystal structure remains unchanged.

The powder X-ray diffraction patterns presented herein were collected by standard techniques. The radiation was CuKα radiation. The peak heights and the positions, as a function of 2θ where θ is the Bragg angle, were read from the relative intensities of the peaks, and d, the interplanar spacing corresponding to the recorded lines, can be calculated.

The present OFF framework type zeolite may be substantially free of non-OFF framework type material. By "substantially free of non-OFF framework type material" is meant that the zeolite composition disclosed herein contains less than 2.5% non-OFF framework type character (e.g., less than 1% non-OFF framework type character, less than 0.5% non-OFF framework type character, or no measurable non-OFF framework type character), as measured by X-ray diffraction. The presence of these impurities can be determined and quantified by analysis of the X-ray diffraction pattern of a sample. The term "non-OFF framework type material" used herein means any material that does not contain crystalline zeolite of the OFF framework type. Examples of such non-OFF framework type material may include, for example, amorphous material, FAU framework type zeolites and ERI framework type zeolites.

EXAMPLES

The following illustrative examples are intended to be non-limiting.

Example 1

5.36 g of deionized water, 2.01 g of a 45% KOH solution, 5.88 g of a 10.79% cyclopropyltrimethylammonium hydroxide solution and 2.00 g of CBV760 Y-zeolite (Zeolyst International, $SiO_2/Al_2O_3$ molar ratio=60) were mixed together in a Teflon liner. The resulting gel was stirred until it became homogeneous. The liner was then capped and placed within a Parr steel autoclave reactor. The autoclave was placed in an oven and heated at 160° C. for 5 days. The solid products were recovered from the cooled reactor by centrifugation, washed with deionized water and dried at 95° C.

Figure 2:
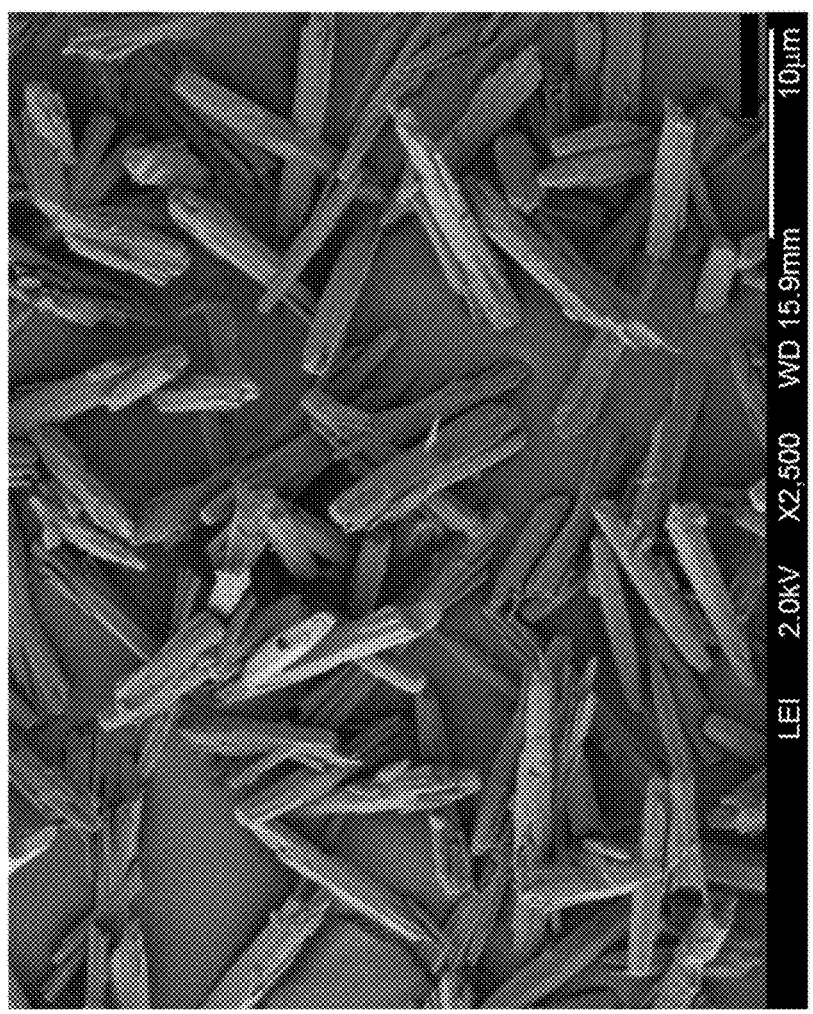
FIG. 2 is a Scanning Electron Micrograph (SEM) image of the as-synthesized zeolite prepared in Example 1.

The resulting product was analyzed by powder XRD and SEM. The powder XRD pattern is shown in FIG. 1 and indicates that the material is a pure phase zeolite of OFF framework type. The SEM image is shown in FIG. 2 and indicates a uniform field of crystals.

The product had a $SiO_2/Al_2O_3$ molar ratio of 13.22, as determined by ICP elemental analysis.

Example 2

9.54 g of deionized water, 4.02 g of a 45% KOH solution, 19.59 g of a 10.79% cyclopropyltrimethylammonium hydroxide solution and 5.00 g of CBV760 Y-zeolite (Zeolyst International, $SiO_2/Al_2O_3$ molar ratio=60) were mixed together in a Teflon liner. The resulting gel was stirred until it became homogeneous. The liner was then capped and placed within a Parr steel autoclave reactor. The autoclave was placed in an oven and heated at 160° C. for 5 days. The solid products were recovered from the cooled reactor by centrifugation, washed with deionized water and dried at 95° C.

Powder XRD indicated that the product was a pure phase zeolite of OFF framework type.

The product had a $SiO_2/Al_2O_3$ molar ratio of 13.93, as determined by ICP elemental analysis.

Example 3

13.90 g of deionized water, 4.02 g of a 45% KOH solution, 14.69 g of a 10.79% cyclopropyltrimethylammonium hydroxide solution and 5.00 g of CBV720 Y-zeolite (Zeolyst International, $SiO_2/Al_2O_3$ molar ratio=30) were mixed together in a Teflon liner. The resulting gel was stirred until it became homogeneous. The liner was then capped and placed within a Parr steel autoclave reactor. The autoclave was placed in an oven and heated at 160° C. for 5 days. The solid products were recovered from the cooled reactor by centrifugation, washed with deionized water and dried at 95° C.

Powder XRD showed that the product was a pure phase zeolite of OFF framework type.

The product had a $SiO_2/Al_2O_3$ molar ratio of 12.79, as determined by ICP elemental analysis.

Example 4

5.67 g of deionized water, 3.01 g of a 45% KOH solution, 24.49 g of a 10.79% cyclopropyltrimethylammonium hydroxide solution and 5.00 g of CBV720 Y-zeolite (Zeolyst International, $SiO_2/Al_2O_3$ molar ratio=30) were mixed together in a Teflon liner. The resulting gel was stirred until it became homogeneous. The liner was then capped and placed within a Parr steel autoclave reactor. The autoclave was placed in an oven and heated at 160° C. for 5 days. The solid products were recovered from the cooled reactor by centrifugation, washed with deionized water and dried at 95° C.

Powder XRD showed that the product was a pure phase zeolite of OFF framework type.

The product had a $SiO_2/Al_2O_3$ molar ratio of 12.91, as determined by ICP elemental analysis.

Example 5

The as-synthesized zeolite of Example 1 was calcined in a muffle furnace under a flow of air heated to 540° C. at a rate of 1° C./minute and held at 540° C. for 5 hours, cooled and then analyzed by powder XRD.

The powder XRD pattern showed that the material remained stable after calcination to remove the organic structure directing agent.

Example 6

The calcined material from Example 5 was treated with a 1N ammonium nitrate solution (10 mL/g of zeolite) at 90° C. for 2 hours. The solution was cooled, decanted off and the process repeated.

The ammonium-exchanged zeolite product was subjected to a micropore volume analysis using $N_2$ as adsorbate and via the B.E.T. method. The zeolite exhibited a micropore volume of 0.18 cm$^3$/g.

The invention claimed is:
1. A method of preparing a zeolite of OFF framework type, the method comprising:
 (a) preparing a reaction mixture comprising:
  (1) a source of silicon oxide;
  (2) a source of aluminum oxide;
  (3) a source of a Group 1 or Group 2 metal (M);
  (4) a structure directing agent (Q) comprising cyclopropyltrimethylammonium cations;
  (5) a source of hydroxide ions; and
  (6) water; and
 (b) subjecting the reaction mixture to crystallization conditions sufficient to form crystals of the zeolite.
2. The method of claim 1, wherein the reaction mixture has a composition, in terms of molar ratios, as follows:

| | |
|---|---|
| $SiO_2/Al_2O_3$ | 10 to 100 |
| $M/SiO_2$ | 0.10 to 0.60 |
| $Q/SiO_2$ | 0.10 to 0.50 |
| $OH/SiO_2$ | 0.30 to 1.00 |
| $H_2O/SiO_2$ | 10 to 60. |

3. The method of claim 1, wherein the reaction mixture has a composition, in terms of molar ratios, as follows:

| | |
|---|---|
| $SiO_2/Al_2O_3$ | 20 to 80 |
| $M/SiO_2$ | 0.20 to 0.50 |
| $Q/SiO_2$ | 0.15 to 0.35 |
| $OH/SiO_2$ | 0.40 to 0.70 |
| $H_2O/SiO_2$ | 15 to 40. |

4. The method of claim 1, wherein the Group 1 or Group 2 metal comprises potassium.

5. The method of claim 1, wherein the crystallization conditions include a temperature of from 125° C. to 200° C.

6. A zeolite of OFF framework type and, in its as-synthesized form, comprising cyclopropyltrimethylammonium cations in its pores.

7. The zeolite of claim 6, and having a molar ratio of $SiO_2/Al_2O_3$ in a range of 5 to 20.

8. The zeolite of claim 6, and having a molar ratio of $SiO_2/Al_2O_3$ in a range of 10 to 20.

* * * * *